Feb. 14, 1939.     D. G. TAYLOR     2,147,274
CONTROL MECHANISM
Filed Feb. 28, 1936

INVENTOR
Daniel G. Taylor
BY HIS ATTORNEY
George H. Fisher

Patented Feb. 14, 1939

2,147,274

UNITED STATES PATENT OFFICE 2,147,274

CONTROL MECHANISM

Daniel G. Taylor, Minneapolis, Minn., assignor to Minneapolis-Honeywell Regulator Company, Minneapolis, Minn., a corporation of Delaware Application February 28, 1936, Serial No. 66,215

4 Claims. (Cl. 201—55)

This invention relates to control mechanism and more particularly to that type of device adapted to control a source, or a plurality of sources, of heat through the actuation of a thermostatic element.

One object of this invention is the provision, in a single control unit, of a proportioning control mechanism and a make and break contact switching mechanism actuated by a single thermally responsive element.

Another object is the provision of an improved thermostat including a proportioning control comprising an arm adapted to travel over a resistance element and an open contact switching mechanism actuated by the movement of the arm.

A further object is the provision of such a mechanism as described in the preceding paragraph wherein the open contact switch is actuated by the proportioning control arm at, or near, one limit of its range of movement.

A further object is the provision of a control system for heat regulation comprising a thermostat adapted to regulate, through a potentiometer coil, a proportioning heating device such as a unit ventilator, and through a two position switching mechanism, a second heating device such as a conventional radiator.

A more specific object is the provision of a control system adapted to actuate, from a single thermostatic element, such mechanism as a unit ventilator and a conventional radiator, the arrangement being such that when the full heat radiating capacity of the unit ventilator is required, the radiator may be actuated to supplement the amount of heat provided to the space which it is desired to heat.

As conducive to a clearer understanding of the invention, it may here be pointed out that in the arrangement of heating systems adapted for various uses it is sometimes desirable to provide a conventional heating equipment which may be comprised of radiators supplied with steam from a central heating plant and also, in the same space, to provide unit ventilating mechanism. Such unit ventilating mechanism may take the form of a ventilator device provided with dampers to control the admission of air from a source exterior of the building or room, the temperature of which it is desired to control, and also provided with means to heat the air so admitted, which may comprise steam coils supplied with steam from the same central source of heat referred to above.

Under normal circumstances, the unit ventilator supplies all necessary heat. It will sometimes happen, however, that the heating capacity of the unit ventilator is insufficient, under abnormal conditions, such as unusually cold weather, to maintain the temperature at the desired level. Under such circumstances, it is desirable that the heating capacity of the unit ventilator be supplemented by that of the radiator. There has hitherto been experienced considerable difficulty in providing a control mechanism which would regulate and proportion the amount of heat supplied by the unit ventilator, to the temperature conditions maintained within the space to be heated and which would also, upon a requirement for more heat, automatically supply such heat from auxiliary heating means, as might be comprised of conventional steam radiators.

One object of this invention is the provision of a mechanism which will obviate the above difficulties in an efficient and satisfactory manner.

Other objects will in part be obvious and in part pointed out hereinafter.

Accordingly, the invention consists in the combinations of elements, arrangements of parts, and features of construction all as will be hereinafter pointed out and shown in the accompanying drawing and the scope of the application of which will be indicated in the appended claims.

Referring now to the drawing.

Similar reference characters designate similar parts throughout the several views of the drawing.

Figure 1:
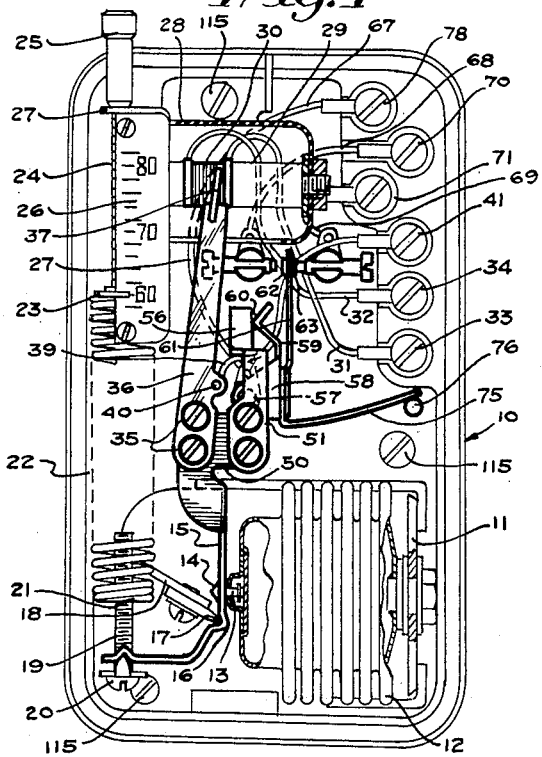
Figure 1 is a front elevational view of a structure embodying the features of the instant invention.

Referring now to the drawing and more particularly to Figure 1, there is generally indicated at 10 an insulating panel to which is secured, in any desired manner, a bracket 11. A volatile fluid bellows 12 having an extending projection 13 is secured to and carried by bracket 11. Projection 13 abuts a suitable indentation 14 in a bell-crank lever 15. Lever 15 has a concavo-convex portion 16 which pivotally engages a knife edge 17 carried by a suitable supporting member 18. One end of lever 15 has passed therethrough a screw 19 having a head 20 which serves to hold the same normally juxtaposed to lever 15. Screw 19 threadedly engages a suitable threaded aperture in a plate 21 rigidly secured to the bottom of a spring 22. An indicating arm 23 is rigidly secured to the opposite end of spring 22 which engages a threaded member 24 having an extending head 25. A scale plate 26 bearing indicia is mounted adjacent indicating arm 23 on a suitable bracket, a fragment of which is shown at 27. Also mounted on bracket 27 and extending laterally therefrom is a resistance element 29 which may take the form of a conventional potentiometer having a coil 30. An insulating housing 28 surrounds coil 30. Wires 31 and 32 lead from the opposite ends of coil 30 to appropriate terminals 33 and 34 respectively carried by panel 10.

Figure 3:
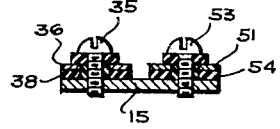
Figure 3 is a sectional view taken along the line 3—3 of Figure 2.

The end of lever 15 opposite screw 19 has mounted thereon, as by means of suitable screws 35, a leaf spring 36 which has a contact finger 37 secured to an extremity in any desired manner, as by soldering. Finger 37 is so arranged as to be juxtaposed to potentiometer coil 30 and held in contact therewith by the action of spring 36. Suitable insulating washers 38, as better shown in Figure 3, are positioned about screws 35 between lever 15 and spring member 36 in order to electrically insulate spring 36 from lever 15 and its associated parts. A wire 39 extends from a suitable junction 40 with spring 36 to an appropriate terminal 41 carried by insulating panel 10.

From the above it will now be seen that the temperature in the space wherein is mounted the instrument will, upon fluctuation, vary the pressure within bellows 12, which movement will in turn be imparted through projection 13 and indentation 14 to lever 15. One end of lever 15 being held substantially fixed by the pull of spring 22, the opposite end, which carries leaf spring 36 and finger 37, will be moved to vary the position of contact finger 37 with respect to potentiometer coil 30. The operation of this proportioning mechanism which comprises a conventional potentiometer is well known and need not be described here.

It will further be seen that by adjustment of head 25, the tension of spring 22 may be varied in order that contact finger 37 may assume a different position with respect to coil 30 at different temperature values. Screw 19 provides suitable means whereby the instrument may be calibrated at the factory to predetermine these temperature values. The indicia, previously referred to, carried by scale plate 26 may, accordingly, take the form of temperature value indications in degrees.

Lever 15 has an extending portion 50 which has mounted thereon an abutment member 51. As better shown in Figure 2, member 51 comprises an upwardly extending portion 52, secured to portion 50 of lever 15 by screws 53 and insulated therefrom by suitable insulating washers 54, an inwardly extending portion 55 and a second upwardly extending portion 56. Mounted adjacent portion 56 upon a pivot pin 57 is a bracket 58 which bears an extending member 59 shaped to form an abutment 60, and a leaf spring contact 61 having contact buttons 62 and 63 on opposite sides thereof. The arrangement is such that abutment 60 is juxtaposed to upwardly extending portion 56 of bell crank member 51. Mounted adjacent contact buttons 62 and 63 are posts 64 and 65 bearing contact screws 66 and 67, respectively. Wires 68 and 69 lead respectively from contact posts 64 and 65 to terminals 70 and 71 carried by insulating panel 10. Bracket 58 also bears a leaf spring 75 extending outwardly therefrom and adapted to abut a post 76 mounted in panel 10. A wire 77 leads from contact bearing arm 61 to an associated terminal 78.

Figure 2:
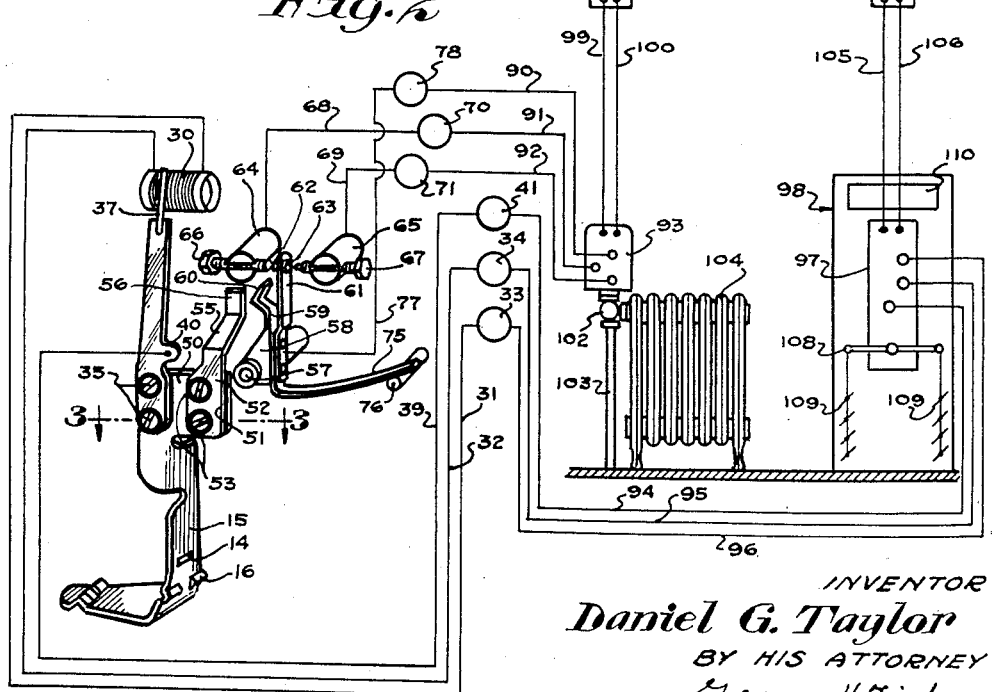
Figure 2 is a schematic showing partially in perspective of one of the various applications of the structure of the instant invention to a control system.

From the foregoing it will now be seen that as lever 15 is moved towards the left as seen in Figures 1 and 2 by the pressure of bellows 12, contact button 62 abuts contact screw 66 and that leaf spring 75, through its abutment with post 76, serves normally to hold the parts in the position described immediately above in the absence of extraneous pressure. Such extraneous pressure, however, is occasioned when, upon a predetermined drop in temperature bellows 12 contracts sufficiently to permit spring 22 to bear upwardly against the head 20 of screw 19 and consequently rotate lever 15 about its fulcrum knife edge 17 to move the end of lever 15 which bears contact finger 37 toward the right, whereupon upwardly extending portion 55 of bell-crank member 51 engages abutment 60 to force the contact bearing member 61 to the right against the pressure of leaf spring 75 and consequently to engage contact button 63 with contact screw 67. Upon an increase in temperature, bellows 12 expands and spring 75 through engagement with member 61 returns contact 62 to engagement with contact screw 66.

Having now particular reference to Figure 2, it will be seen that wires 90, 91 and 92 lead from terminals 78, 70 and 71, respectively, to appropriately positioned terminals carried by a valve motor 93. It will also be seen that wires 94, 95 and 96 lead from contacts 41, 34 and 33, respectively, to appropriate contacts carried by a proportioning motor 97 comprising a portion of a unit ventilator, generally indicated at 98. Valve motor 93 is energized through suitable line wires 99 and 100 which lead from step-down transformer 101 which is in turn connected to any suitable source of power (not shown) and serves to actuate a valve 102 associated with the steam supply line 103 of a conventional radiator 104.

Proportioning motor 97 may be of any desired type although such a motor as disclosed in Patent No. 1,989,972 granted to Lewis L. Cunningham has been found to be well adapted to serve the requisite purpose. Motor 97 is energized through wires 105 and 106 leading from a step-down transformer 107 to which power is supplied from any suitable source (not shown) which may be the same source as that referred to in connection with transformer 101. Motor 97 is preferably provided with a lever arm 108 which is in turn operably associated with a plurality of sets of dampers 109 positioned in a passage (not shown) which leads from the exterior to the interior of the space to be heated. The arrangement of these sets of dampers is such that one set controls the admission of fresh air and the other the extrusion of recirculated air and one set opens proportionately as the other set closes. This arrangement is known in the art and forms no portion of the instant invention. A radiator 110 also controlled by motor 97 is provided to supply adequate heat to the air passing thereby.

It will now be seen, upon consideration of the foregoing, that, assuming the parts to be in the position shown in Figure 2, the temperature requirements of the room are substantially satisfied. Finger 37 is held by the previously described action of bellows 12 adjacent a portion of potentiometer coil 30 which provides through proportioning motor 97 a maximum admission of fresh air through dampers 109 and a minimum of heat from radiator 110. As the temperature decreases, finger 37 will be moved to the right along coil 30 to provide a constantly decreasing admission of fresh air through dampers 109 and an increasing amount of heat from radiator 110 in proportion to the temperature requirements of the space. The theory of proportioning control and the operation of the above mentioned elements is well known and needs no further discussion in connection with the instant invention.

Assume, however, the temperature drops to a point so low that dampers 109 completely preclude the admission of fresh air and unit ventilator 98 is providing substantially its full capacity of heat through radiator 110, further travel of finger 37 and its associated mechanism including lever 15 and bell-crank member 51 to the right will close contact 63—67 to energize valve motor 93 to permit opening of valve 102 and consequent heating of radiator 104. Upon a slight increase in temperature, however, leaf spring 75 will force contact 63 out of engagement with contact screw 67 and place contact 62 in engagement with contact screw 66 which will in turn serve to energize valve motor 93 to close valve 102 and return full control to unit ventilator 98.

Insulating panel 10 may be secured to a wall or other suitable surface, as by means of mounting screws 115, and a suitable casing (not shown) may be provided to enhance the appearance of the instrument as well as to protect the same from damage.

While there has been herein described an application of the control mechanism of the invention to a unit ventilator and a radiator, it will be readily apparent to those skilled in the art that its uses will be many and varied and the limitation of the application of the device to a system as described is not contemplated.

From the foregoing it will now appear that there is herein provided a structure which achieves in an efficient and practical manner the objects of this invention including many advantages of great practical importance, such as simplicity of construction, a minimum of working parts, reliability in operation and efficiency in providing adequate control of a heating, or other, installation.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim as my invention:

1. A device of the character described comprising in combination, a pressure responsive device, a lever actuated by said pressure responsive device, a resilient arm mounted on one end of said lever, an electrical resistance element, a slider mounted on said arm and adapted to slide across said resistance as said lever is moved back and forth by said pressure responsive device, a first abutment member carried by said lever, a second pivoted abutment member, a stationary pin, a resilient arm carried by said second abutment member, said last mentioned resilient arm engaging said pin to bias said second abutment member in one direction, said second abutment member being rotated against its bias by said pressure responsive device by means of said first abutment member, and control means actuated by said second abutment member.

2. A device of the character described comprising in combination, a bellows, a lever pivoted intermediate its ends, a bellows abutting said lever on one side of its pivot, a spring engaging said lever on the other side of its pivot and holding it in contact with said bellows whereby expansion and contraction of said bellows will cause said lever to rotate back and forth about its pivot, a resilient arm mounted on said lever, an electrical resistance element, a slider mounted on said arm and adapted to slide over said resistance element as said lever rotates on its pivot, a first abutment member mounted on said lever, means for insulating said abutment member with respect to said lever, a second abutment member pivoted independently of said lever, a stationary pin, a resilient arm carried by said second abutment member, said last mentioned resilient arm engaging said pin so as to bias said second abutment member in one direction, means for rotating said second abutment against its bias comprising said first abutment, and an open contact switch actuated by said second abutment.

3. A temperature sensitive device adapted for use in controlling space heaters, comprising in combination, a temperature responsive bellows, a lever actuated by said bellows, a resilient arm mounted on one end of said lever, means for insulating said arm with respect to said lever, an electrical resistance, a slider mounted on said resilient arm and adapted to slide across said resistance as said lever is moved back and forth by said bellows, a first abutment carried by said lever, means for insulating said abutment with respect to said lever, a second abutment pivoted independently of said lever, a stationary member, a resilient arm carried by said second abutment and engaging said stationary member to bias said second abutment in one direction, and control means actuated by said second abutment, said bellows responding to temperature which is changing in one direction to first move said slider across said resistance and thereafter cause said first abutment to engage and move said second abutment against its bias to actuate said control means.

4. A temperature sensitive device adapted for use in controlling space heaters, comprising in combination, a temperature responsive bellows, a lever actuated by said bellows, a resilient arm mounted on one end of said lever, means for insulating said arm with respect to said lever, an electrical resistance, a slider mounted on said resilient arm and adapted to slide across said resistance as said lever is moved back and forth by said bellows, a first abutment carried by said lever, means for insulating said abutment with respect to said lever, a second abutment pivoted independently of said lever, a pair of spaced stationary contacts, a movable contact carried by said second abutment between said stationary contacts, a stationary pin, and a resilient arm carried by said second abutment engaging said pin and biasing said movable contact into engagement with one of said stationary contacts, said bellows responding to a temperature change in one direction first causing said slider to slide across said resistance and then causing said first abutment to engage said second abutment to rotate it against its bias and cause said movable contact to disengage said one stationary contact and engage said other stationary contact.

DANIEL G. TAYLOR.